United States Patent [19]

Kanfi

[11] Patent Number: 5,559,991
[45] Date of Patent: Sep. 24, 1996

[54] INCREMENTAL COMPUTER FILE BACKUP USING CHECK WORDS

[75] Inventor: Arnon Kanfi, Randolph, N.J.

[73] Assignee: Lucent Technologies Inc., Murray Hill, N.J.

[21] Appl. No.: 495,242

[22] Filed: Jun. 27, 1995

Related U.S. Application Data

[63] Continuation of Ser. No. 258,352, Jun. 9, 1994, abandoned, which is a continuation of Ser. No. 787,276, Nov. 4, 1991, abandoned.

[51] Int. Cl.[6] ................................................. G06F 12/16
[52] U.S. Cl. ..................... 395/489; 395/600; 395/182.11
[58] Field of Search ........................... 364/200 MS File, 364/900 MS File; 395/488, 489, 600, 182.04–182.06, 182.11

[56] References Cited

U.S. PATENT DOCUMENTS

| | | | |
|---|---|---|---|
| 4,084,231 | 4/1978 | Capozzi et al. | 395/425 |
| 4,267,568 | 5/1981 | Dechant et al. | 395/600 |
| 4,283,787 | 8/1981 | Chambers | 371/37.1 |
| 4,417,321 | 11/1983 | Chang et al. | 395/600 |
| 4,641,274 | 2/1987 | Swank | 395/200 |
| 4,654,819 | 3/1987 | Stiffler et al. | 395/425 |
| 4,912,637 | 3/1990 | Sheedy et al. | 395/600 |
| 5,239,647 | 8/1993 | Anglin et al. | 395/600 |
| 5,276,867 | 1/1994 | Kenley et al. | 395/600 |
| 5,347,653 | 9/1994 | Flynn et al. | 395/600 |

FOREIGN PATENT DOCUMENTS 405926  6/1990  European Pat. Off. .

OTHER PUBLICATIONS

*Operating Systems Review* (SIGOPS), vol. 25, No. 5, May 1991, New York, US, "The Design and Implementation of a Log–Structured File System", p. 4, paragraph 3.3—p. 5.
*IBM Technical Disclosure Bulletin*, vol. 24, No. 5, Oct. 1981 New York, US, pp. 2404–2406, K. L. Huff, "Data Set Usage Sequence Number".

*Primary Examiner*—Matthew M. Kim
*Attorney, Agent, or Firm*—Frederick B. Luludis

[57] ABSTRACT

A facility is provided for storing in a backup memory only those blocks of a file, or disk partition, which differ from corresponding blocks forming an earlier version of the file. Specifically, a file is divided into a number of blocks and a "signature" is generated for each such block. A block is then stored in the backup memory only if its associated signature differs from a signature generated for an earlier version of the block. In addition, if two blocks of the current version of the file have identical signatures and are to be stored in the backup memory, then only one of the two blocks is stored in the memory and a simple message indicating that the other block is equal to the one block is stored in the memory for the other block. Further, the application of such signatures is advantageously applied to the opposite case of restoring a file using copies of previous versions of the file that are stored in the backup memory.

23 Claims, 10 Drawing Sheets

FIG.2

SIGNATURE TABLE 200

| TIME STAMP |
|---|
| F1 |
| CRC1 |
| CRC2 — 2 |
| CRC3 |
| CRC4 |
| CRC5 — 5 |
| CRC6 — 6 |
| ... |
| CRC28 — 28 |
| ... |
| CRC80 |
| CRC81 |
| ... |
| CRC300 |
| CRCN — N |

FIG.3

| | ARCHIVE MEMORY 300 | |
|---|---|---|
| 301 → | TIME STAMP 1 | F1 |
| 302 → | 1 | DATA BLOCK 1 |
| 303 → | 2 | DATA BLOCK 2 |
| | 3 | DATA BLOCK 3 |
| | 4 | DATA BLOCK 4 |
| | ○ ○ ○ | ○ ○ ○ |
| 305 → | 28 | DATA BLOCK 28 |
| | ○ ○ ○ | ○ ○ ○ |
| 304 → | 80 | F | 28 | 81 | F | 28 |
| | ○ ○ ○ | ○ ○ ○ |
| | N | DATA BLOCK N |

FIG. 4

SIGNATURE TABLE 400

| TIME STAMP |
| F1 |
| CRC1 |
| CRC2X |
| CRC3 |
| CRC4 |
| CRC5X |
| CRC6X |
| ... |
| CRC28X |
| ... |
| CRC300 |
| ... |
| CRCNX |
| CRCN+1 |

- CRC2X — 2
- CRC5X — 5
- CRC6X — 6
- CRC28X — 28
- CRCNX — N
- CRCN+1 — N+1

ARCHIVE MEMORY 500

| TIME STAMP 2 | F1 |
|---|---|
| 2 | DATA BLOCK 2 |
| 5 | DATA BLOCK 5 |
| 6 | DATA BLOCK 6 |
| 28 | DATA BLOCK 28 |
| N | DATA BLOCK N |
| N+1 | DATA BLOCK N+1 |

501 points to the TIME STAMP 2 row header.

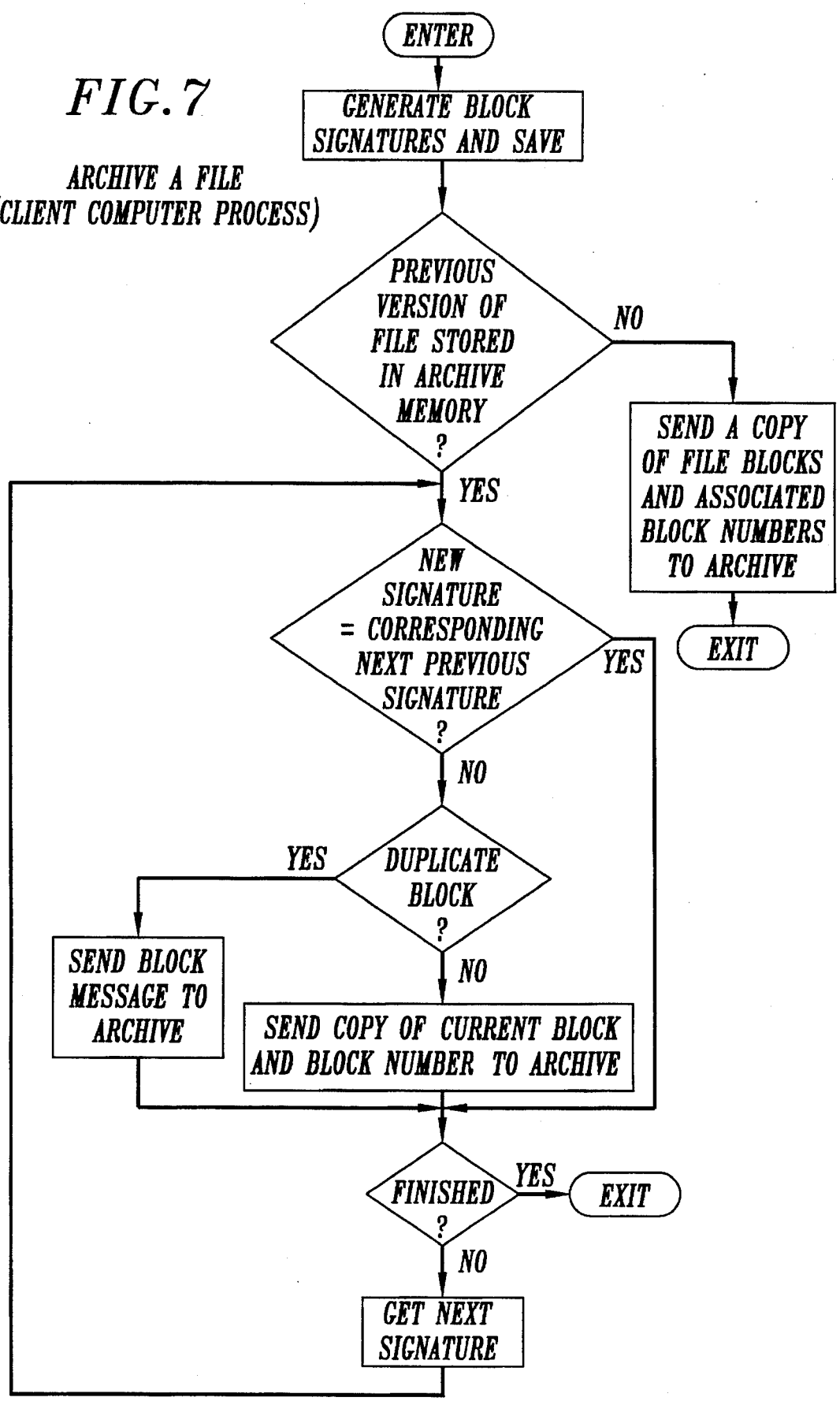

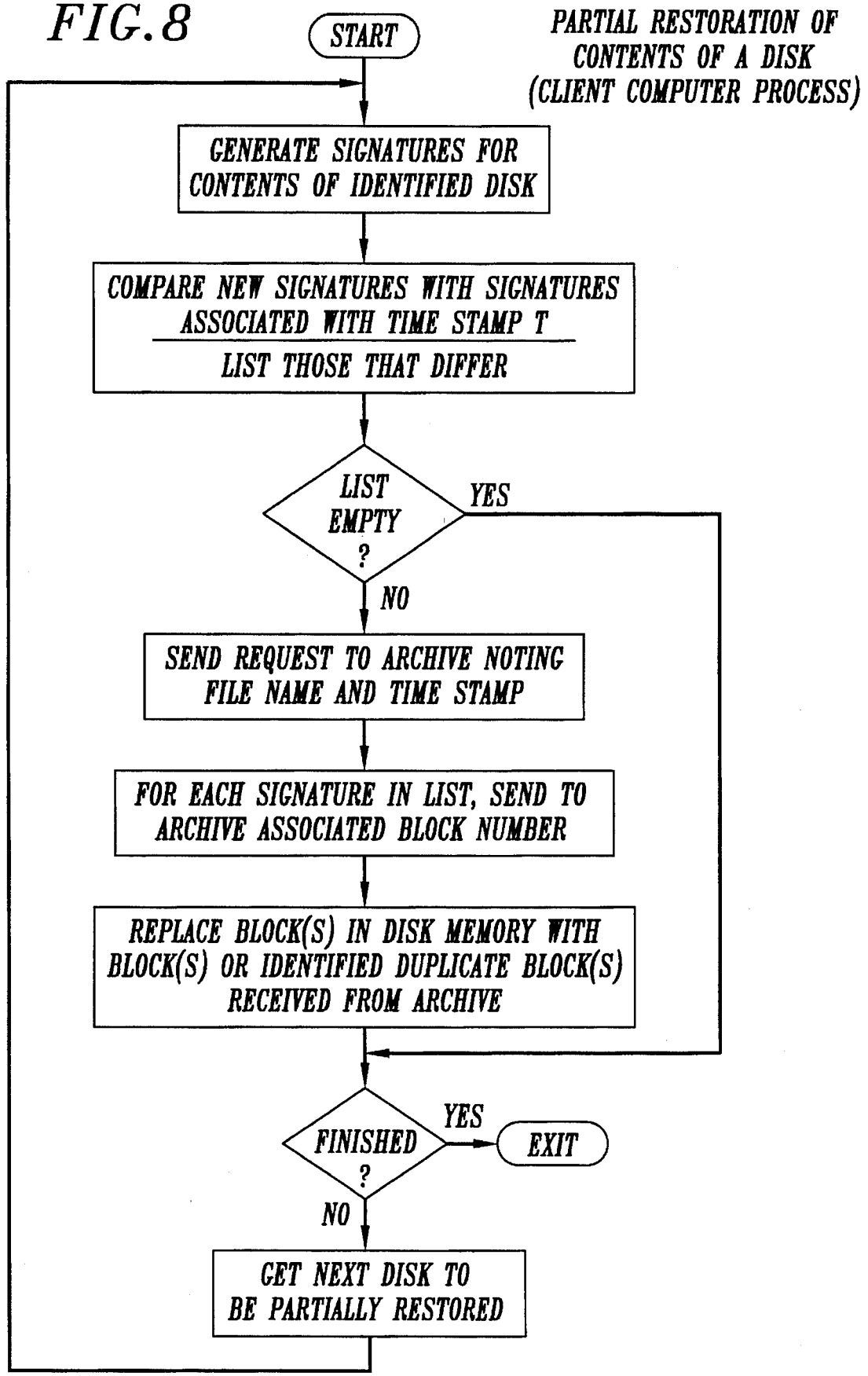

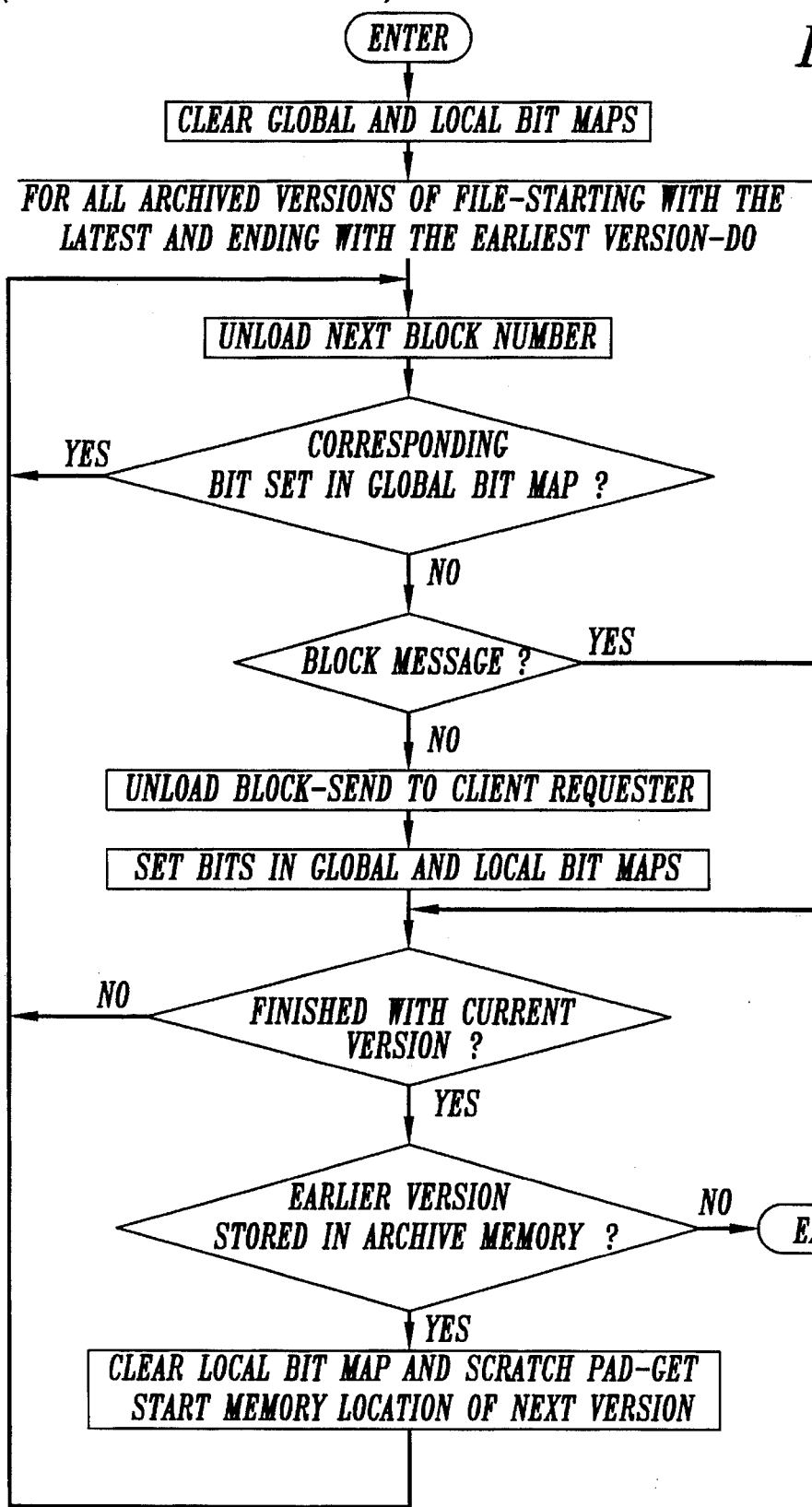
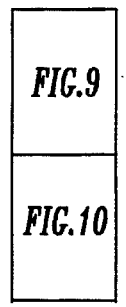

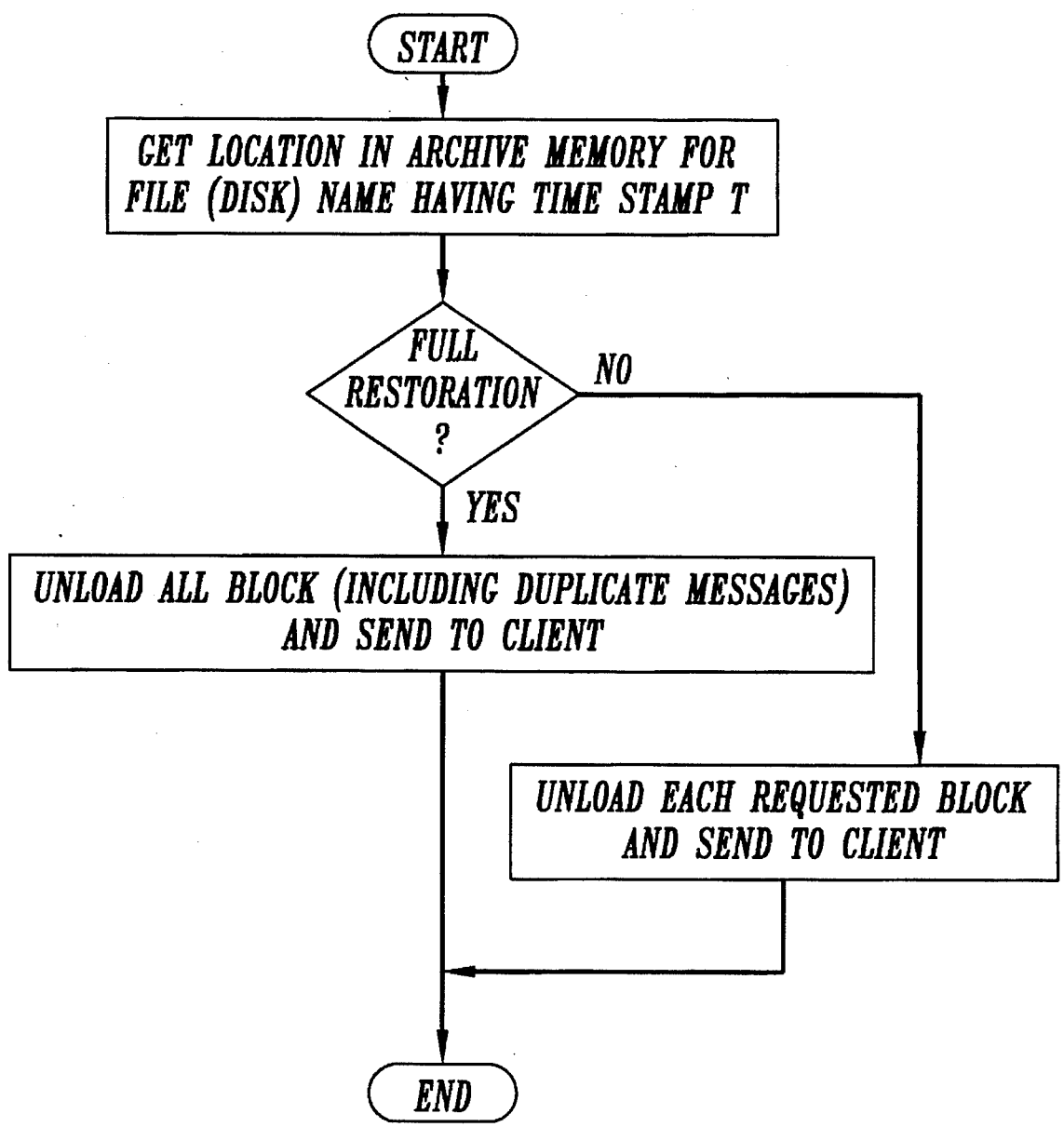

5,559,991

1

INCREMENTAL COMPUTER FILE BACKUP USING CHECK WORDS

This application is a continuation of application Ser. No. 08/258,352, filed on Jun. 9, 1994, now abandoned, which application is a continuation of application Ser. No. 07/787,276, filed on Nov. 4, 1991, now abandoned.

TECHNICAL FIELD

The invention relates to storing a computer file or memory partition in a backup memory.

BACKGROUND OF THE INVENTION

Conventional computer file backup techniques allow what is commonly referred to as an incremental backup of a file using a time stamp associated with the file. As a result of such backup techniques, different versions of a file may be stored in the memory of a backup media. The capacity of the backup media is generally not overburdened when the size of a file being stored on the media is small. However, when the size of a file and each version thereof is very large, or the file is a disc partition, then the capacity of the backup media may be used up quickly. This problem is especially true when the difference between two versions of a large file, or disc partition, is not great, since it results in storing in the backup media two slightly different versions of the same file each of which is very large.

SUMMARY OF THE INVENTION

The above problems are dealt with in accord with the principles of the invention by dividing a file, or disc partition, into blocks, generating a signature for each such block, in which the signature is indicative of the values foxing the contents of the associated block, and then storing in a backup memory only those blocks whose signatures differ from signatures generated for corresponding blocks of a previous version of the file, or disc partition. In the event that a previous version of the file does exist, then all blocks of the current file are stored in the backup memory.

As an aspect of the invention, if at least two blocks have the same signatures and the to be stored in the backup memory, then only one of the two blocks is stored in the backup memory and a message is stored in the backup in place of the other block, in which the message simply indicates that the other block is identical to the one block.

In accord with other aspects of the invention described below in detail, such signatures are used in the restoration of a file employing earlier versions of the file that may be stored in the backup.

BRIEF DESCRIPTION OF THE DRAWING

FIG. 2 is an illustrative example of a table of block signatures generated in accord with an aspect of the invention for a file F1;

FIG. 3 is an illustrative example of one possible way of storing file F1 in a so-called archive memory;

FIG. 4 is an illustrative example of a table of block signatures generated in accord with an aspect of the invention for a later version of file F1;

FIGS. 7 and 8 illustrate in flow chart form a program which implements the principles if the invention in a client computer, such as the computers 10 of FIG. 1;

FIGS. 9, 10 and 11 illustrate in flow chart form a program which implements the principles of the invention in an archive computer, such as computer 110 of FIG. 1; and FIG. 12 shows how FIGS. 9 and 10 should be arranged with respect to one another.

DETAILED DESCRIPTION

Figure 1:
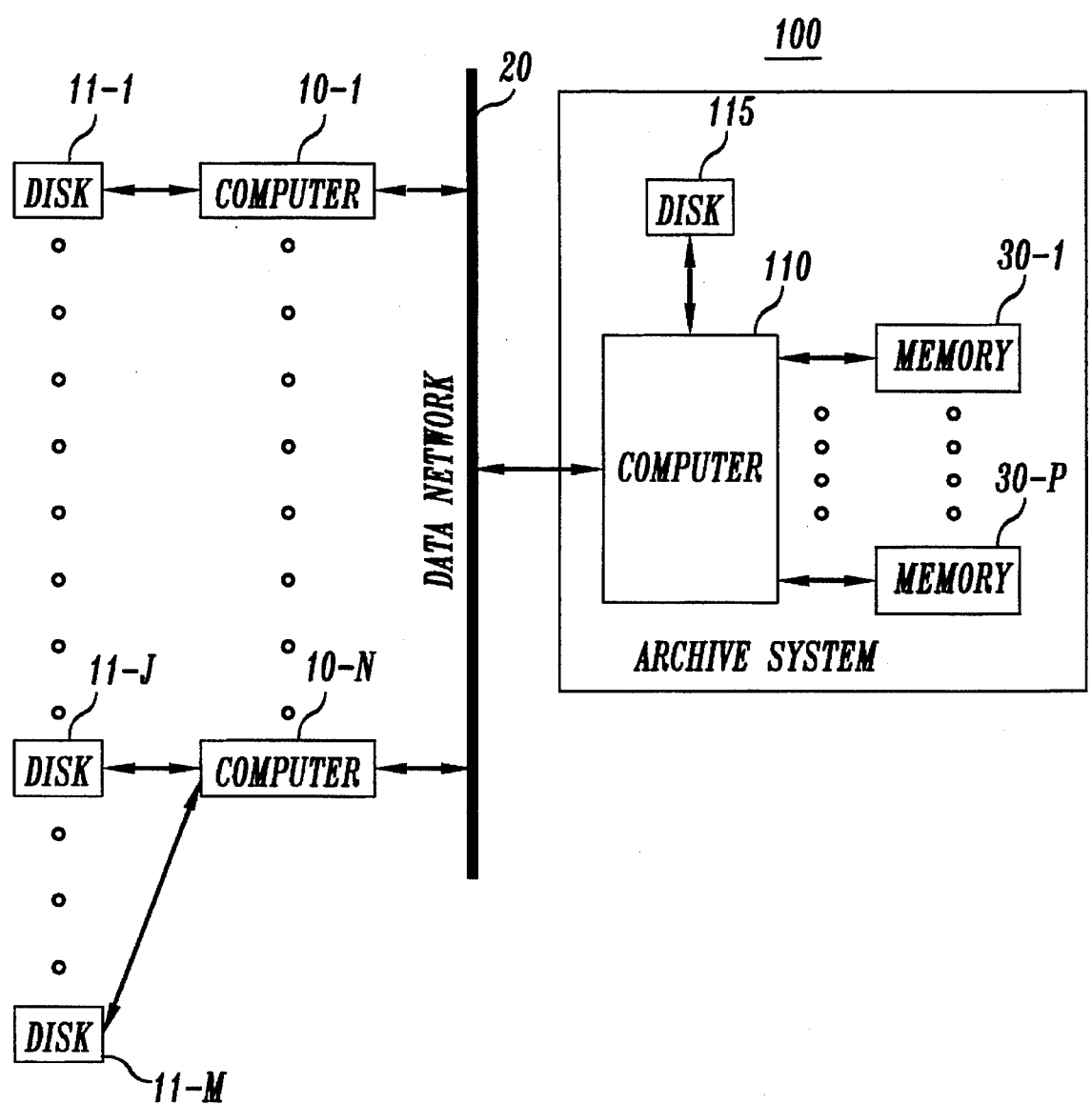
FIG. 1 shows a broad block diagram of a computer archiving system in which the principles of the invention may be practiced.

Turning now to FIG. 1, archiving system 100 includes computer 110 and hard disc unit 115. The software which drives system 100 is stored in disc 115. Computer 110, which may be, for example, the SPARCSTATION 2 commercially available from Sun Microsystems, Inc., operates in a conventional manner to periodically poll individual ones of computers 10-1 through 10-N via data network 20. Data network 20 may be, for example, the well-known Ethernet network. Computer 110 invokes such polling on a scheduled basis (e.g., daily, weekly, monthly, etc.) and does so for the purpose of storing in one of the memories 30-1 through 30-P the contents of the memory associated with one of computers 10-1 through 10-N that is being polled. Such contents typically comprise a plurality of named files composed of data and/or programs, and may be on the order of, for example, forty megabytes to several gigabytes of memory. In an illustrative embodiment of the invention, each of the memories 30-1 through 30-P may be, for example, a so-called rewritable optical disc library unit (commonly referred to as a "jukebox"). One such "jukebox" is the model OL112-22 unit commercially available from Hitachi with each such unit having a number of 644 megabyte optical disc drives that are also commercially available from Hitachi. In the practice of the invention, each of the computers 10-1 through 10-N may be either a personal computer, minicomputer or a large main frame computer. In addition, each of the disc units 11-1 through 11-M may actually be one or more disc units. (Herein each of the designations J, M, N and P shown in FIG. 1 is a respective integer. In addition, the term "file" is taken to mean a program, data, disc partition or contents of a memory including any subset thereof.)

Assume that computer 110 is engaged in an archiving session with one of the computers 10-1 through 10-N, e.g., computer 10-1. The latter computer unloads from its associated disc unit a file that is to be archived and supplies the file, block by block, to computer 110 via network 20 for storage in one of the backup memories 30-1 through 30-P, e.g., memory 30-1. In an illustrative embodiment of the invention, a block of a file that is to be archived comprises a predetermined number of data bytes—illustratively 1000 data bytes. In addition, each such file is preceded by a file header identifying, inter alia, the name of computer 10-1, path name of the file currently being passed, the date of the last change made to the file, as well as other information associated with the file. However, a block of a file is passed to computer 110 only if the block had not been previously archived. That is, computer 10-1, in accord with the invention, calculates a signature for each block of a file that is to be archived, in which a signature is indicative of the values of the bytes forming the contents of the associated block. Computer 10-1 then supplies to computer 110 only those blocks of the file having signatures which are different from corresponding signatures generated during a prior archiving session involving the same file.

Assume that computer 10-1 desires to store (archive) on memory 30-1 via computer 110 a new file F1. In doing so, computer 10-1 generates a signature for each block of data forming file F1 and stores each such signature in a table that is assigned to file F1 and stored in the internal memory of computer 10-1. Each such signature is stored in the table at a location corresponding with the address (e.g., sequence number) of its associated block.

In implementing the invention, a signature may be generated using any one of a number of different code generation techniques. In an illustrative embodiment of the invention, a block signature is generated by passing the data forming a respective block through a conventional Cyclic-Redundancy-Code (CRC) generator, which may be implemented in software. Accordingly, if file F1 comprises N blocks, then the file F1 table would contain N CRC entries.

An example of such a table of signatures, or check words, is shown in FIG. 2, in which Table 200 comprises N entries corresponding to the number of blocks forming file F1. In the FIG. 2, a respective signature is represented by a letter designation, e.g., CRC, and a numerical designation. Thus, the signatures generated for blocks 1, 2, and 3 of file F1 are respectively represented in Table 200 by the designations CRC1, CRC2 and CRC3. The signatures associated with the remaining blocks forming file F1 are similarly represented.

Since it is assumed that file F1 is a new file, a copy of which had not been previously stored on memory 30-1, then computer 10-1 passes to computer 110 via network 20 each block forming file F1. Computer 110, in turn, stores each such block as it is received in one of the archive memories 30-1 through 30-P, e.g., memory 30-1.

In accord with an aspect of the invention, computer 10-1 does not pass to computer 110 a block of file F1, that is identical to another block of file F1 that has been passed to computer 110 during the current archiving session. That is, before computer 10-1 supplies to computer 110 a current block of file F1, computer 10-1 compares the signature associated with that block with the signatures of blocks that have been supplied to computer 110 during the current archiving session. If computer 10-1 finds that such a comparison exists, then computer 10-1 does not archive the associated block. Instead, computer 10-1 supplies to computer 110 a message indicating that the current block is identical to one that has been archived (stored) during the current session.

For example, assume that blocks 80 and 81 of file F1 are identical to block 28. In that case then, the signatures generated for blocks 80 and 81 would be identical to the signature generated for block 28. Accordingly, computer 10-1 does not supply blocks 80 and 81 to computer 110. Instead, computer 10-1 supplies to computer 110 messages, or flags, respectively identifying the fact that blocks 80 and 81 are identical to block 28. Computer 110, in turn, stores the messages in the archive memory 30-1 in the order that the messages are received via network 20.

Turning now to FIG. 3, there is shown an example of one way in which computer 110 may store in archive memory 30-1 the blocks of file F1 that computer 110 receives from computer 10-1. It is seen from the FIG. 2 that the stored blocks of file F1 are preceded in memory by header 301, in which header 301 includes, inter alia, a time stamp and file name identifying file F1. The file name also include other information (not shown) identifying, for example, the so-called pathname associated with file F1. The blocks forming file F1 are stored in sequence in memory 30-1, in which each such block is preceded by its respective block number, as shown at 302 and 303 for blocks one (1) and (2).

It is also seen from the FIG. at 304 that computer 110 has stored in archive memory 30-1 and in place of blocks 80 and 81 the messages that computer 110 received from computer 10-1. As shown at 305 each such message includes its associated block number, followed by a so-called flag and the identity of block 28. Thus, two relatively brief messages are stored in the archiving memory, rather than the respective blocks themselves.

Assume that, after a period of time following the initial archiving of file F1, computer 10-1 communicates with computer 110 for the purpose of storing in one of the archive memories 30-1 through 30-P, e.g., memory 30-1, the latest version of file F1. In doing so, computer 10-1 generates a signature for each block forming the latest version of file F1 and stores each such signature in sequence in a table formed in the internal memory of computer 10-1. An example of the latter table is shown in FIG. 4.

Following the foregoing, computer 10-1 then compares each entry in the newly formed table 400 with its corresponding entry in previously formed table 200. Computer 10-1 does so to determine which blocks forming the latest version of file F1 differ from their corresponding blocks forming the initial, or preceding, version of file F1. In FIG. 4, an "X" is used to indicate that a signature in table 400 is different from the corresponding signature entered in Table 200 of FIG. 2. That is, the signatures at locations 2, 5, 6 and N of Table 400 differ from the signatures stored at the corresponding locations of Table 200. Table 400 also includes an additional signature associated with block (or partial block) N+1 of the latest version of File F1.

Once it is armed with the results of the comparison, computer 10-1, then, in accord with an aspect of the invention, supplies to computer 110 for archiving purposes only those blocks forming the latest, or current, version of file F1 that differ from their corresponding blocks forming the next preceding version of file F1. Thus, in the present example, computer 10-1 supplies to computer 110 those blocks of the current version of file F1 that are associated with the Table 400 signature entries of 2, 5, 6, N and N+1. In addition, computer 10-1 retains a copy of the contents of Table 400 so that the table of signatures may be used in connection with archiving the next, succeeding version of file F1.

Figures 5, 6:
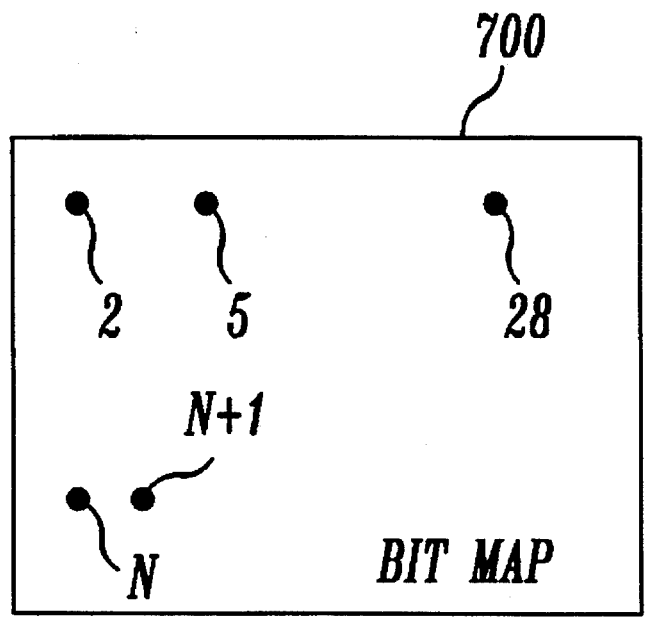
FIG. 5 is an illustrative example of one possible way of storing in the archive memory selected blocks of the later version of file F1.
FIG. 6 is an illustrative example of a so-called global bit map that is used in accord with an aspect of the invention in supplying a backup of an archived file.
Figure 10:
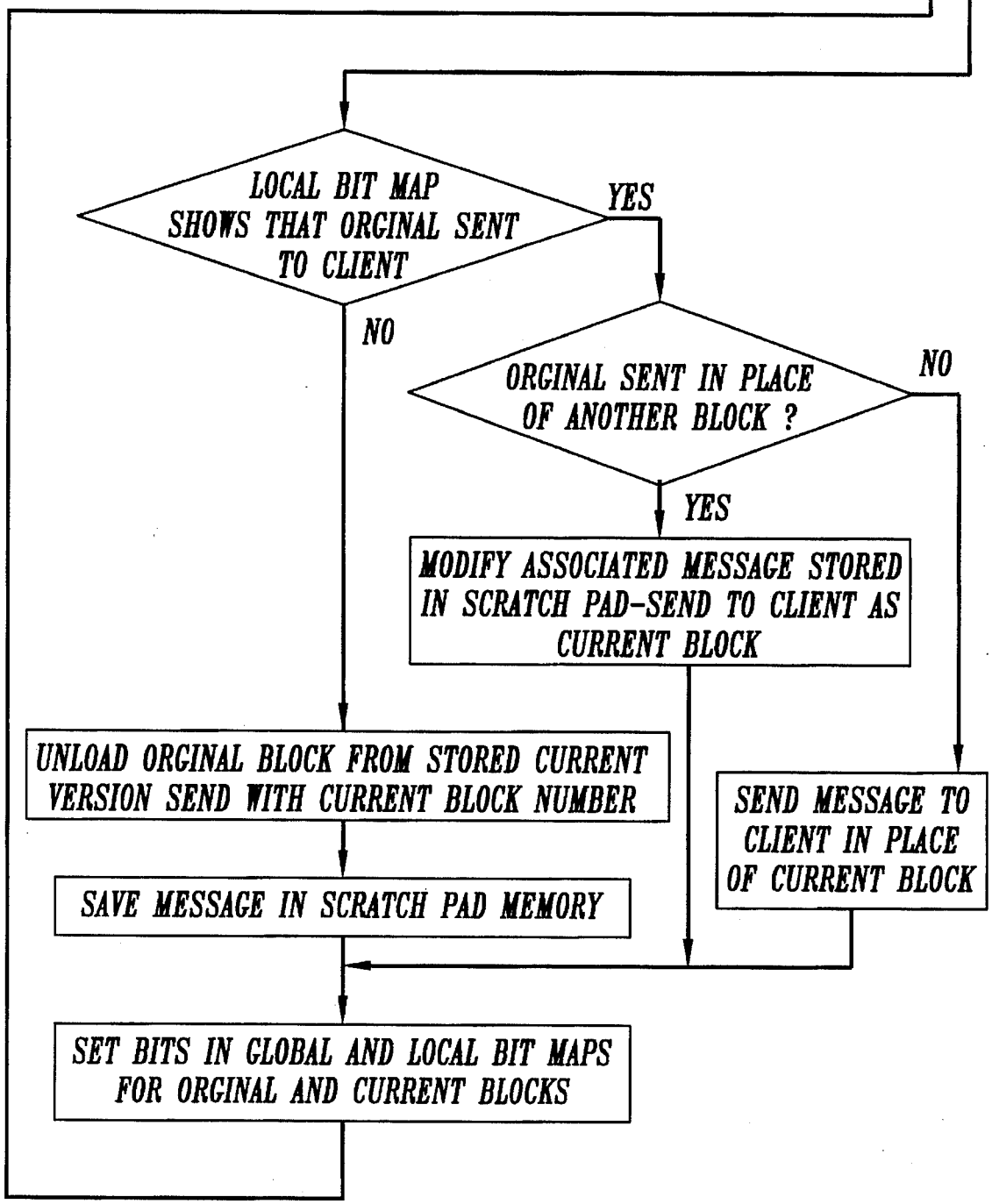

Turning now to FIG. 5, there is shown an example of one way in which computer 110 may store on memory 30-1 the blocks of the latest version of file F1 that computer 110 receives from computer 10-1. It is similarly seen from FIG. 5 that the stored blocks of file F1 are preceded in memory by a header 501, in which time stamp 2 is associated with the latest version of file F1. Like FIG. 3, computer 110 has stored blocks 2, 5, 6, 28, N and N+1 in the order that they were received from computer 10-1, with each block identified by its associated block number. However, in contrast to FIG. 3 and in accord with an aspect of the invention, only those blocks of the latest version of file F1 which differ from their corresponding blocks forming the previous version are stored in the backup memory. Advantageously, then, the two versions of file F1, i.e., the initial version identified by time stamp 301 (FIG. 3) and the latest version identified by time stamp 501 (FIG. 5), are stored on archive memory 30-1 such that the latter version uses significantly less memory space than the former version.

As is well-known, the reason for archiving different versions of a file is to provide a backup copy of the file whenever such a backup is required. For example, assume that the current version of file F1 that had been stored in memory disc unit 11-1 was lost or destroyed. In such a case, a user associated with that file may enter via computer 10-1 a request for a copy of a preceding version of file F1. Computer 10-1, in turn, sends to computer 110 a message requesting a copy of file F1, in which the message includes a time stamp associated with the desired version. Assuming that the desired file F1 is associated with time stamp 2 identifying the version designated 500 in FIG. 5, (also referred to herein as version 501), then computer unloads each block forming that version and supplies the block to computer 10-1 for storage on disc memory unit 11-1.

Specifically, computer 110 first identifies in a conventional way the starting location at which version 501 of file F1 is stored in memory 30-1. Armed with that information, computer 110 then unloads each block in sequence starting with block 2 and ending with block N+1 and supplies each such block as it is unloaded to computer 10-1 via network 20. In doing so, computer 110 tracks in a so-called "global" bit map stored in scratch pad memory internal to computer 110 each block of the backup version of file F1 that it supplies to computer 10-1. For example, when computer 110 supplies to computer 10-1 block 2 of version 501, it sets that bit in the bit map having a bit position corresponding with the number 2, i.e., the second bit position. As a further example, when computer 110 supplies the next block 5 of version 501, it then sets the fifth bit position in the bit map. (Herein, the term "set a bit in the bit map" means to set the pertinent bit to a particular logical value, e.g., a binary one.) Accordingly, once computer 110 has supplied to computer 10-1 the blocks forming stored version 501, then the bits located at bit positions 2, 5, 28, N and N+1 in the global bit map would be set to a logical one. (An example of such a bit map is shown in FIG. 6, in which the aforementioned bit locations in map 700 are set as represented by the respective dots.) The purpose for maintaining the global bit map will be made apparent below.

Following the foregoing, computer 110 then determines, in a conventional manner, the starting location at which a next preceding version of file F1, if any, is stored in memory 30-1. For the present example, that version would be the version designated 300 in FIG. 3 (also referred to herein as version 301). Accordingly, computer 110 unloads from archive memory 30-1, the first block number stored therein and checks the value of the bit at the corresponding bit position in the global bit map. In the present example, the bit at position one of the global bit map would not be set, thereby indicating that computer 110 has not yet supplied to computer 10-1 block 1 of file F1. Accordingly, computer 110 unloads from the archive memory 30-1 block 1 of version 301 and supplies the block to computer 10-1 via network 20. In addition, computer 110 sets the bit at bit position one in the global bit map to indicate that block 1 has been supplied to computer 101. Computer 110 unloads from stored version 301 the next block number, namely block number 2.

For block number 2, computer 110 would find that the bit at bit position two in the global bit map is set to a logical one, thereby indicating that block 2 (namely block 2 of later version 501 ) has been supplied to computer 10-1. In this instance, then, computer 110 would not unload from the archive memory 30-1 the associated block 2, but would go on to unload the next block number, i.e., block number 3. For block numbers 3 through 27 computer 110 would find that the bits located at the respective corresponding positions in the global bit map would not be set. Therefore, computer 110 unloads the associated blocks in sequence from the archive memory 30-1 and supplies them to computer 10-1 as they are unloaded. Similarly, computer 110 sets the bits located at the corresponding bit positions in the global bit map.

Computer 110 then unloads block number 28 from stored version 301. However, in doing so computer 110 would find that the bit at position 28 in the global bit map is set to a logical 1, thereby indicating that block 28, that is, block 28 of version 501 (FIG. 5), has been supplied to computer 10-1. Accordingly, computer 110 would not unload from stored version 301 block 28.

In a similarly manner, computer 110 unloads blocks 29 through 79 of stored version 301 and supplies them to computer 10-1.

Computer 110 similarly maintains in its scratch memory another bit map (local bit map) associated with the stored version of a file that computer 110 is currently unloading. For example, for each block that computer 110 unloads from version 501 (FIG. 5), it sets the corresponding bit in the global bit map and in the local bit map associated with version 501. Computer 110 does so to track by block number the blocks that have been unloaded from a particular archived version of a file. The underlying reason for maintaining a local bit map will be made apparent below.

Thus, as a result of unloading the blocks identified by the numbers 1, 3, 4, 7-27 and 29-79 of stored version 301 and supplying them to computer 10-1, the bits located at bit positions corresponding with those numbers in the associated local bit map would also be set. (An example of a local bit map would be somewhat similar to global bit map 700 depicted in FIG. 6.) Following the foregoing, computer 110 then goes on to unload the block 80 message from stored version 301, which, as mentioned above, indicates that block 80 is identical to block 28. If computer 110 consulted the global map it would find that the bit at position 28 is set to a logical one. (As mentioned above, the latter bit position had been set as a result of computer 110 unloading and supplying to computer 10-1 block 28 of version 501.) However, the block 80 message actually means that block 80 is identical to block 28 of version 301 and not version 501. Accordingly, computer 110 is arranged so that when it encounters a stored block message, such as the block 80 message, it consults the associated local bit map, rather then the global bit map. Computer 110 does so to accurately determine whether a particular block has been supplied to the requesting computer 10. Thus, the flag associated with the block 80 message causes computer 110 to consult the local bit map associated with version 301 to determine if block 28 of that version has been supplied to computer 10-1. Since the local bit map indicates that computer 110 did not supply that block, then, computer 110 unloads the block 28 of version 301 and supplies that block to computer 10-1 as block 80. In doing so, computer 110 sets the bit located at bit position 80 in both the global bit map and the associated local bit map. In addition, computer 110 notes in its scratch pad memory that block 80 is a duplicate of block 28. Computer 110 then goes on to unload the block 81 message.

In response to the block 81 message computer 110 would consult the local bit map associated with version 301 to determine if block 28 has been supplied to computer 10-1. As a result thereof, computer 110 would conclude that block 28 of version 301 has not been supplied to computer 10-1. However, at that point, computer 110 would consult the note it stored in its scratch pad to determine if block 28 of version 301 had been supplied as a duplicate of another block of version 301. Computer 110 would thus find stored in its scratch pad memory the notation indicating that block 28 had been supplied to computer 10-1 as a duplicate of block 80. Accordingly, computer 110 changes the block 81 message to indicate that block 81 is a duplicate of block 80 and supplies the changed block 81 message to computer 10-1. Computer 10-1 responsive to receipt of the message then creates a copy of priorly received block 80 and stores that copy in its associated disc memory unit 11-1 as block 81.

Following the foregoing, computer 110 continues supplying the backup versions in the described manner until the last block thereof is supplied to computer 10-1. In the present example, the last block would be block N+1 of version 301. It is noted that if a version of F1 had been archived prior to version 301, then computer 110 would go on to process that prior version in the described manner in order to restore file F1 in disc unit memory 11-1.

As an aspect of the invention, computers 10-1 through 10-N are also arranged such that, whenever they supply the total contents of their associated memories 11 to computer 110 for storage on one of the archive (backup) memories 30, they generate a table of respective block signatures across such contents. (Such signatures would be stored in a respective table in the form shown in FIGS. 2 and 4.) Thereafter, if a fault caused a particular disc memory unit, e.g., memory 11-1, to become inoperable, and, therefore, had to be replaced, then the replacement disc unit could be loaded with a backup copy of the latest archived version as a way of restoring the contents of that disc unit as it existed at a prior point in time T.

More particularly, if a replaced disc unit memory was one of a group of such disc units, e.g., 11-J through 11-M associated with computer 10-N, then the backup copy that is stored on the replacement disc unit would not be current. Whereas as the contents of the other disc memory units would be current. The contents of the replacement disc unit, therefore, might not possibly agree in time with the contents of the other disc memory units of the group. One approach to this problem is to restore the contents of the other discs to the same point in time T. However, if the capacity of such disc units is very large, e.g., on the order of a gigabit, then the restoration process would consume an inordinate amount of time.

The computers 10-1 through 10-N are arranged to take a different approach, one which is significantly faster than the suggested approach. For example, assume that the group comprises two disc memory units 11-J and 11-M in which disc memory 11-M is replaced and the contents of memory 11-M is fully restored to the way it existed at the prior point in time T. To obtain coherency between the respective contents of memories 11-J and 1 1-M, computer 10-N may then, in accord with an aspect of the invention, restore the contents of memory 11-J as it exited at time T without requesting a full restoration of that disc unit. Specifically, computer 10-N, in accord with an aspect of the invention, generates for each block forming the contents of memory 11-J respective signatures, thereby establishing a current table of signatures. Computer 10-N then compares each signature in the current table with a corresponding signature contained in a prior table of signatures that was created at time T over the contents of memory 11-J. For the present the example, assume that table 400 shown in FIG. 4 is the current table and that table 200 shown in FIG. 2 is the prior table. With that assumption in mind, then, computer 10-N would note that since time T, blocks 2, 5, 6, 28, N and N+1 had changed. Accordingly, to restore the contents of memory 11-J to the point as it existed at time T, then computer 10-1 supplies to computer 110 a request for copies of the blocks identified by the aforementioned numbers, in which the request would include time stamp T. Assuming that time stamp T identifies archived version 301 (FIG. 3), then, computer 110 unloads from archive memory 30-1 the requested blocks of version 301 and supplies them, in turn, to computer 10-N. Computer 10-N responsive to receipt of each requested block stores the block in memory 11-J in place of its later version. Computer 10-N thus achieves coherency in the described manner without resorting to restoring the total contents of memory 11-J.

FIGS. 7 and 8 illustrate in flow chart form a program which implements the principles of the invention in client computers 10-1 through 10-N. Similarly, FIGS. 8–11 illustrate in flow chart form a program which implements the principles of the invention in archive computer 110. In view of the fact that FIGS. 7–11 are self-explanatory, especially when viewed in conjunction with the foregoing detailed description, and in the interest of conciseness, no further explanation thereof is provided herein.

The foregoing is merely illustrative of the principles of the invention. Those skilled in the art will be able to devise numerous arrangements, which, although not explicitly shown or described herein, nevertheless embody those principles that are within the spirit and scope of the invention. For example, the task of generating and maintaining signatures and signature tables could be implemented in archive computer 110. In such an instance, then, a computer, e.g., computer 10-1, would pass an initial or later version of a file to computer 110 for archiving purposes (in which the term file includes the total contents of a disc memory). Computer 110 would then generate the signatures for the blocks of the received file, and then store in one of the archive memories only those blocks of the received file having signatures which differ from their corresponding next preceding signatures. In addition, although memories 11-1 through 11-P were defined herein as being disc memories, it is apparent that such memories could be another type of memory. For example, any type of magnetic or optical memory media.

I claim:

1. Apparatus for storing a file in an archive memory comprising means for dividing said file into a plurality of blocks and for assigning respective block numbers to said blocks, each of said blocks containing a predetermined number of data bytes, means for generating for each of said blocks of said file a current check word determined as a function of the current contents of the respective block of said file and for storing each said current check word in said archive memory, and means for storing in said archive memory each of said current blocks of said file having a current check word different from a check word that was generated for a correspondingly numbered block of a prior version of said file stored in said archive memory, wherein different groups of stored blocks of said data bytes form respective versions of is said file, and wherein said apparatus further comprises a global bit map comprising a plurality of bit locations corresponding to respective ones of said block numbers, means, responsive to one of said blocks being unloaded from said memory, for setting in said bit map the bit whose location corresponds with the block number of said one block, and means, operative prior to unloading another one of said stored blocks of a respective one of said groups, for preventing the unloading of said other one of said blocks if the corresponding bit in said bit map for said other one of said blocks had been set as a result of unloading a correspondingly numbered block of another one of said groups.

2. The apparatus set forth in claim 1 wherein said means for storing each of said current blocks includes means for causing said current block to be stored in said memory if said check word for said correspondingly numbered block does not exist.

3. The apparatus set forth in claim 2 wherein said file is the contents of a memory device.

4. The apparatus set forth in claim 1 wherein the current block of said file and blocks of said prior version of said file are assigned respective time stamps.

5. The apparatus set forth in claim 1 further comprising means for storing said current check word in a table identified by a time stamp assigned to said file, said current check word being stored in said table in the order that said current check word is generated.

6. The apparatus set forth in claim 1 wherein said means for storing includes means operative if the current check words respectively generated for first and second blocks of said file equal one another for then storing in said memory in place of said second block a message indicating that the contents of said second block equals the contents of said first block, in which said first and second blocks are not necessarily adjacent blocks in said file.

7. The apparatus set forth in claim 6 wherein the blocks of said file and blocks of said prior version of said file are assigned respective time stamps.

8. The apparatus set forth in claim 7 further comprising computer means communicating with said archive memory, said computer means comprising means responsive to receipt of a request to restore said file for unloading from said memory the blocks of said file representing respective earlier version of said file stored in said memory and supplying the unloaded blocks to a user such that said unloading is based on the reverse order that said versions were stored in said memory.

9. The apparatus set forth in claim 8 wherein said means for unloading the blocks of said file representing respective earlier versions of said file includes means, responsive to the unloading of said message indicating that the contents of said first and second blocks are equal, for then unloading said first block and supplying that block to said user as said second block.

10. The apparatus set forth in claim 7 wherein said means for unloading the blocks of said file representing respective earlier versions of said file further includes a local bit map comprising a plurality of bits corresponding with respective ones of the block numbers of the blocks forming a group of blocks currently being unloaded, said group of blocks currently being unloaded including said message indicating that the contents of said first and second blocks are equal, means, responsive to one of said blocks of the group of blocks currently being unloaded from said memory, for setting in said local bit map the bit whose location corresponds with the block number of said one block of said current group, and means, responsive to the unloading of said message, for supplying said first block to said user as said second block if the bit in said local bit map corresponding with the block number identifying said first block is not set or supplying said message to said user if the latter bit in said local bit map is set.

11. The apparatus set forth in claim 10 wherein said means for unloading the blocks of said file representing respective earlier versions of said file further includes means, responsive to said first block being supplied to said user as said second block, for setting the bit in said local bit map corresponding with said first block even though said first block of said group of blocks currently being unloaded is not supplied to said user as said first block.

12. The apparatus set forth in claim 8 wherein said memory comprises at least two memories independent of one another, and wherein said file represents data contained in one of said at least two memories, and wherein said apparatus further comprises means, responsive to the storage of a previous version of said file on said one of said at least two memories, for then dividing data contained in the other one of said memories into respective blocks and generating respective check words for those blocks, and means, responsive to generating check words for said other one of said memories, for replacing in said other one of said memories those blocks whose check words differ from the check words generated for corresponding blocks forming a previous contents of said other one of said memories.

13. A method for storing a file in a memory comprising the steps of dividing said file into a plurality of blocks each containing a predetermined number of data bytes having respective values, assigning respective sequential numbers to said blocks and generating for each of said blocks of said file a check word indicative of the values of the data bytes forming the respective block of said file, and storing in said memory those of said blocks of said file having check words different from check words generated for correspondingly numbered blocks of a prior version of said file, wherein groups of stored blocks form respective versions of said file, and wherein said method further comprises the steps of maintaining a global bit map comprising a plurality of bit locations corresponding to respective ones of said block numbers, responding to one of said blocks being unloaded from said memory by setting in said bit map the bit whose location corresponds with that one of said block numbers assigned to said one block, and responding to an unloading of another one of said stored blocks of a respective one of said groups by preventing the unloading of said other one of said blocks if the corresponding bit in said global bit map for said other one of said blocks had been set as a result of an unloading of a correspondingly numbered block of another one of said groups characterizing a later version of said file.

14. The method set forth in claim 13 wherein said step of storing includes the step of storing all of said blocks in said memory if said check words generated for correspondingly numbered blocks of a prior version of said file do not exist.

15. The method set forth in claim 13 wherein the blocks of said file and blocks of said prior version of said file are assigned respective time stamps.

16. The method set forth in claim 13 further comprising the step of storing said check words in a table identified by a time stamp assigned to said file, said check words being stored in said table in the order that said check words are generated.

17. The method set forth in claim 13 wherein said step of storing includes the step of responding when the check words respectively generated for first and second blocks of said file equal one another by storing in said memory in place of said second block a message indicating that the contents of said second block equals the contents of said first block, in which said first and second blocks are not necessarily adjacent blocks in said file.

18. The method set forth in claim 17 wherein the blocks of said file and blocks of said prior version of said file are assigned respective time stamps.

19. The method set forth in claim 18 further comprising the steps of responding to receipt of a request to restore said file by unloading from said memory the blocks of said file representing respective earlier versions of said file that may be stored in said memory and supplying them to a user such that said unloading of said earlier versions is based on the reverse order that said earlier versions were stored in said memory.

20. The method set forth in claim 19 wherein said step of unloading said earlier versions of said file further includes the step of responding to the unloading of said message indicating that the contents of said second block equals the contents of said first block by unloading said first block and supplying that block to said user as said second block.

21. The method set forth in claim 20 wherein said step of unloading earlier versions of said file further includes the steps of maintaining a local bit map comprising a plurality of bits corresponding with respective ones of the block numbers of the blocks forming a group of blocks currently being unloaded, said current group including said message, responding to one of said blocks of the current group being unloaded from said memory by setting in said local bit map the bit whose location corresponds with that one of said block numbers assigned to said one block of said current group, and responding to the unloading of said message by supplying to said user as said second block either said first block or said message if the bit in said local bit map corresponding with the block number identifying said first block is not set or is set, respectively.

22. The method set forth in claim 19 wherein said step of unloading said earlier versions of said file further includes the step of responding to said first block being supplied to said user as said second block by setting the bit in said local bit map that is associated with said first block even though said first block of said current group is not supplied to said user as said first block.

23. The method set forth in claim 19 wherein said memory comprises at least two memories independent of one another, and wherein said file represents a contents of one of said at least two memories, and wherein said method further comprises the steps of responding to a storage of a previous version of said file on said one of said at least two memories by dividing data contained in the other one of said at least two memories into respective blocks and by generating respective check words for those blocks and responding to the generation of said check words for said other one of said memories by replacing in said other one of said memories those blocks whose check words differ from the check words generated for their corresponding blocks forming a previous version of the contents of said other one of said memories.

* * * * *